Patented Jan. 8, 1952

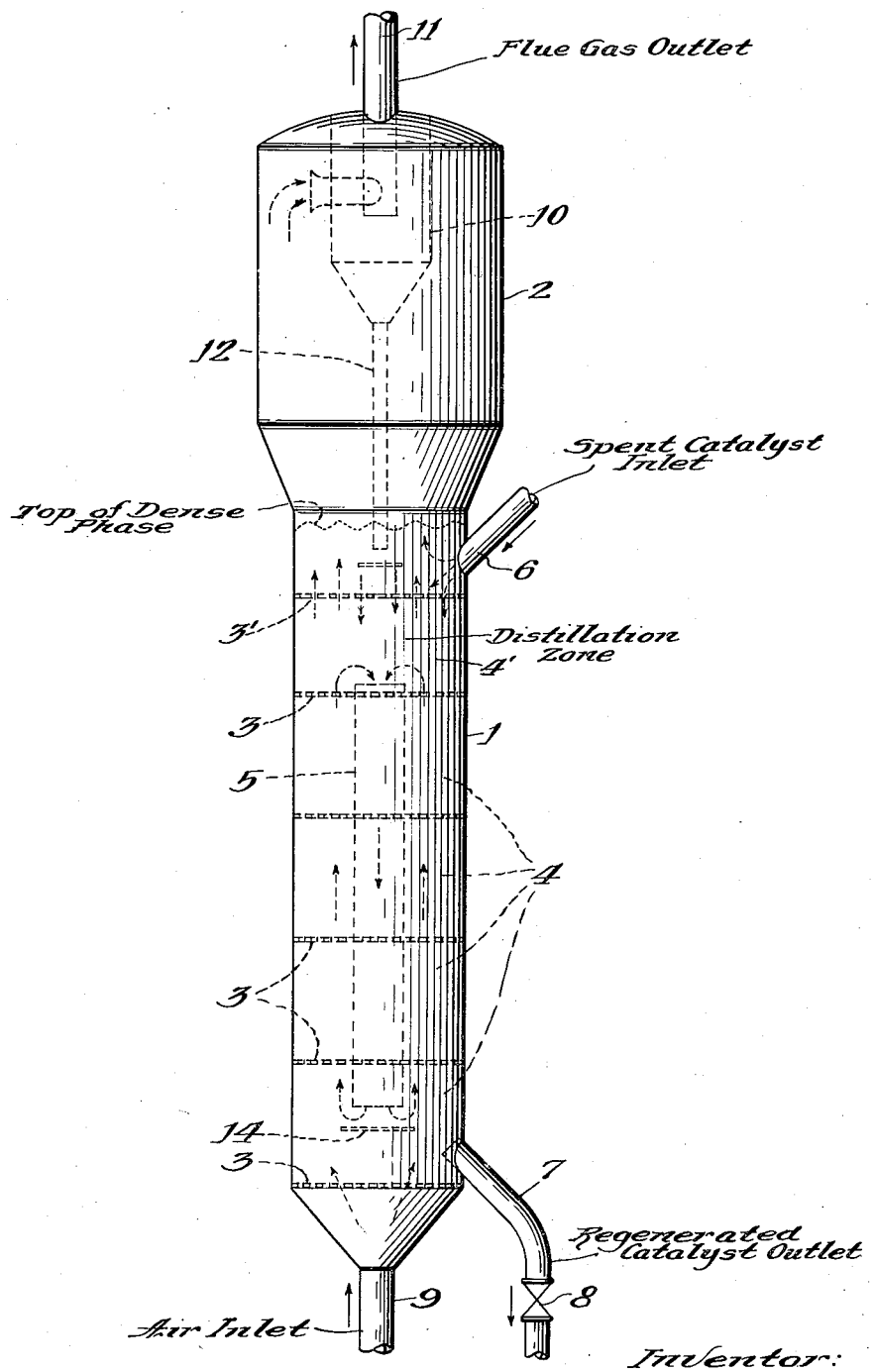

2,581,670

UNITED STATES PATENT OFFICE 2,581,670

REGENERATION OF FLUIDIZED CATALYST

Louis S. Kassel, Riverside, Ill., assignor to Universal Oil Products Company, Chicago, Ill., a corporation of Delaware Application July 19, 1947, Serial No. 762,121

6 Claims. (Cl. 252—417)

This invention relates to an improved method and apparatus for the regeneration of finely divided catalyst particles and more particularly to an improved contacting and operating arrangement whereby catalyst is passed through a regeneration zone in a controlled manner providing a more equalized and favorable temperature distribution throughout the regenerating zone, and as a result thereof an improved rate of catalyst reactivation.

Briefly, the improved regenerator comprises an elongated chamber having a baffled lower zone in which a series of superimposed contacting sections or zones are maintained, with a recycling conduit or "downpipe" being provided to connect an upper contacting zone to the bottom zone of the series. The superimposed zones are preferably separated by perforated plates or baffles having sufficient restrictive ability and providing sufficient pressure drop to permit fluidized catalyst particles to move only in an upward direction, with the regenerating gas stream providing the fluidizing medium to transfer the particles from one section to the next higher.

Briefly, the improved regenerating operation provides for introducing an oxidizing gas stream to the lower end of the regenerating zone, in which catalyst is maintained in fluidized condition within the aforesaid series of contacting zones, so that the catalyst particles are transferred upwardly through the series in a fluidized state and under conditions precluding any downward flow of catalyst from one zone to that next lower. The velocity is also maintained sufficiently high to have the catalyst particles move rapidly upward and to provide but a minor temperature gradient throughout the entire reactivation zone, while effecting and maintaining an oxygen gradient from one superimposed zone to another. As the catalyst particles accumulate in the upper reactivation zone of the series, they are returned through the downpipe extending to the lower zone of the series so that a recycling operation is thereby provided to insure a complete and adequate reactivation of the particles prior to their being withdrawn from the regenerating zone.

In the usual fluid catalytic conversion unit and in carrying out the now well known fluidized type process, finely divided catalyst is employed to contact a reactant stream, with the catalyst maintained in a state of fluidization in which the vaporized charge stream serves to hold the particles in an agitated state of hindered settling within a confined reaction zone. The used or spent catalyst is withdrawn from the reaction zone and passed to a regenerating zone and therein contacted with an oxygen-containing stream in order to effect the removal of carbonaceous contaminating matter and so that the catalyst particles may be reused in the reaction zone. In a manner similar to the action within the reaction zone, the oxygen-containing stream serves to agitate and hold the particles in a condition of hindered settling during the burning and reactivation operation. The process is usually carried out in a continuous manner, freshly regenerated catalyst being continuously charged to the reaction zone and contaminated catalyst being continuously passed from the reaction zone to the regeneration zone.

The catalyst particles may be of natural origin, such as ground bauxite, montmorillonite, and the like, or of synthetic origin from prepared compounds of silica and a metal oxide, such as the well known silica magnesia, silica alumina and silica zirconia catalysts. The particular conversion operation to be carried out will of course determine the type of catalyst to be chosen for use in the unit. As is known to those familiar with the art, the catalyst regenerating operation is of considerable importance since the rapid and adequate removal of the contaminating matter on the catalyst is necessary to provide a rapid and high degree of conversion within the reaction zone, and as a result thereof catalyst regenerating methods have been subjected to considerable study and investigation.

It is the principal object of the invention to provide an operation which results in a more uniform temperature distribution throughout a baffled regenerating zone, while retaining an oxygen concentration gradient from bottom to top therein.

It is also a principal object of the invention to provide a controlled upward movement of catalyst from one section to another in a baffled regenerating zone, without there being any backward flow between contacting sections, and to provide flow channeling means for recycling catalyst from top to bottom of the regenerating zone such that a continuous cyclic flow is maintained therethrough and an efficient reactivation of catalyst particles attained.

Various methods of baffling have been used in connection with fluidized catalyst contacting chambers and some arrangements have proved to be of advantage in giving better contacting and distribution of catalyst particles within the reactant stream. Also, spaced baffles in a regenerating chamber provide a series of contacting zones in which there is an oxygen gradient, the oxygen decreasing in concentration from the bottom to the top of the chamber where the unit has the reactivating gas supplied to the lower end thereof. This oxygen gradient is beneficial in that contaminated catalyst may be charged to the top of the regenerator, in a zone of low oxygen concentration, such that the combustion and flue gases may be utilized to effect a distilling and stripping action on the particles being charged thereto, and to thereby remove a portion of the adsorbed and occluded hydrocarbonaceous materials on the catalyst, prior to effecting the more severe burning and coke removal operation in the lower contacting zones wherein the oxygen concentration is higher.

It is also advantageous to maintain an oxygen gradient within the regenerating zone in order to prevent the undesirable effects of "after burning," which is the burning of a combustible mixture of gases resulting in the upper light phase zone of a regenerator and which may occur when there is excess oxygen in the flue gas stream. In general, it has been determined that the phenomenon of afterburning is not likely to occur if the regeneration operation is carried out in a manner to insure that not more than 1.5 mol percent of free oxygen is left within the flue gas stream carrying to the top of the regeneration zone.

On the other hand, one of the disadvantages of the usual baffled regenerator is that there is an appreciable temperature gradient present therein, with the lower zone operating at a considerably higher temperature than the upper zones of the series of baffle zones. Also, in the usual regenerator the major part of the burning is effected in the lower portion thereof in a zone of high oxygen concentration, and the catalyst handled in such a way that along with the fluidized or hindered settling action there is a downward flow of catalyst particles. Thus, where a catalyst has a temperature limit which must not be overstepped, the rate of burning and the temperature within the lower zone or zones controls the operation of the overall regeneration, and the average temperature throughout any given regenerator may be relatively low, with a resulting low coke removal and catalyst regeneration.

The present invention provides for controlling flow whereby a more uniform temperature is attained throughout the entire height of the dense phase zones of the regenerator, hot catalyst being moved upwardly through the superimposed contact zones at a relatively rapid rate. The increased velocity or rate of catalyst movement effects an increased temperature in the upper zones and a more uniform temperature distribution throughout the entire regenerator such that there is provided a higher "weighted" average temperature and an increased overall average rate of reactivating the catalyst. In other words, the improved operation effecting the better temperature distribution will result in a higher rate of carbon removal for a given quantity of catalyst passing through the regenerator per hour, as compared to the same sized regenerating zone handling the same quantity of catalyst per hour with a high temperature in the lower part of the regeneration zone and an overall lower average temperature.

The more uniform temperature which is obtained by the improved flow operation of this invention also results in a higher temperature in the upper part of the regenerating zone, where the spent catalyst is preferably being charged upon transfer from the reaction zone, and an increased efficiency in the distilling and stripping action, which the hot combustion gases effect on the spent catalyst particles, is obtained prior to the transfer of the particles to the burning zone.

The improved flow and preferred regenerator construction as well as other advantageous features of this operation will be apparent upon reference to the accompanying drawing and the following description thereof.

Referring now to the drawing, there is shown an elevational view of a preferred embodiment of the improved regenerator, providing means to carry out the improved catalyst reactivation operation. The lower portion 1 of the regenerating chamber is of an elongated form and has a relatively small cross sectional area as compared to the upper portion 2 of the chamber which provides a larger cross sectional area separation zone. The lower portion of the chamber 1 is provided with a plurality of spaced perforated plates or other type of restrictive grids 3, which in turn form a series of superimposed contacting zones 4. Also, within the lower chamber portion 1 is a vertical open ended conduit 5 which provides means for recirculating solid particles in a relatively dense compact mass from an upper contacting zone 4 to the lower contacting zone of the series.

In the embodiment shown, spent contaminated catalyst is charged through the inlet 6 to the upper portion of the elongated chamber 1, above the distribution grid 3'. The spent catalyst particles descend through the grid 3' into a distillation and stripping zone 4' and may thus be contacted with flue gases which pass upwardly through the chamber, prior to their passing on downwardly through the conduit 5, while reactivated catalyst particles are withdrawn from the lower contacting zone of the regenerator chamber through outlet conduit 7, having a control valve 8. The air stream, or other reactivating gas, is charged to the lower end of the regenerator by way of inlet 9 and passes upwardly therethrough contacting and fluidizing the catalyst particles in each of the series of superimposed zones 4. A baffle member 14 is preferably placed below the bottom of the downpipe 5 to prevent the air stream from entering the lower end thereof and interfering with the catalyst recirculation. The flue gases resulting from the coke burning and regenerating operation pass to the upper enlarged portion of the chamber prior to being discharged from the chamber through the particle separator 10 and the outlet 11. The operation is normally such that a dense catalyst and gas phase exists in the lower portion of the chamber, the top of the dense phase bed being indicated by the broken line 13, and a dilute catalyst and gas phase exists within the enlarged cross sectional area upper portion of the chamber. The enlarged portion is suitable for effecting a substantial separation between the gas stream and the catalyst particles so that only a small amount of catalyst is carried to the top of the regenerator by the outgoing flue gas stream. The particles entrained with the flue gases are, however, removed by the separator 10 and returned to the contacting zones by means of a dip-pipe 12. The separator in the drawing is indicated to be of the centrifugal or cyclone type, however, other mechanical or electrical types of separators may of course be used and it is not intended to limit the operation or the apparatus of this invention to any one type of particle separating device.

In operating the regenerator in the improved manner of this invention, the flow of catalyst is controlled in a special manner such that the catalyst particles as they are fluidized move upwardly only through each of the contacting zones 4, with all downward movement of catalyst being accomplished in a gravity flow through the grid 3' and the down pipe 5. Other than for the distribution grid 3', each of the perforated plates or grids 3 have a limited amount of open area and are designed to provide a definite pressure drop between each of the series of contact zones. Thus, in carrying out the desired operation, the regenerating gas stream effects a fluidization of particles in a relatively dense phase hindered settling bed within each zone, while simultaneously transporting catalyst particles in a fluidized manner upwardly from one contacting zone to that next higher one. The velocity of the air stream and the transfer rate is maintained at a relatively high velocity such that hot catalyst particles will be carried upwardly through each of the successive zones in a relatively rapid manner. Burning of the contaminated carbonaceous deposit on the catalyst particles will of course begin upon the oxygen-containing stream coming in contact therewith in the lower of the contacting zones and this burning continues in each of the particles until the carbonaceous matter is either removed or until the catalyst is carried to a zone having little or no oxygen present. In the present embodiment, the oxygen content of the gas stream will be the highest in the lower contacting zones, as in some of the other types of baffled regenerators, and the highest rate of burning will also be effected therein, however, by maintaining a relatively high rate of catalyst transfer upwardly through each of the successive zones, as noted hereinabove, the hot catalyst particles reaching the upper zones will maintain a fairly uniform and high average temperature throughout the entire regenerator.

The spent catalyst being charged to the regenerator through inlet 6 and being passed to the stripping zone 4', together with the catalyst particles being transferred upwardly through the top flow restricting grid plate 3 will normally accumulate in a compact dense phase and descend by gravity flow through the open-ended conduit or downpipe 5 to the lower end of the regenerator. Catalyst particles are thus recycled through the contacting zones and an efficient regeneration operation may be effected, even though the rate of movement through each of the zones may be such that a short time contact is effected in a single pass. Continuous circulation in the unit is assured by proper balancing of pressure differentials and pressure drops in the grids, the weight of the catalyst in the downpipe 5 is such as to balance the total pressure differential from top to bottom in the regeneration zone.

It may be seen from the description of the improved operation, that the upward catalyst flow through the superimposed contacting zones maintains the advantages of the oxygen gradient throughout the regenerator, and the advantage of better contact afforded by baffling plates, while at the same time obtaining the benefits of the higher average temperature throughout the entire regenerator such that an increased rate of carbon removal is obtained. To state the improvement another way, the improved temperature distribution together with the advantage of obtaining a recycle operation, insures an adequate and efficient reactivation of all catalyst particles, and that an increased amount of contaminated catalyst may be handled in the same sized regenerator.

The regenerator shown in the drawing indicates that the downpipe 5 is centrally placed and that the contacting zones 4 are of an annular shape and of relatively small cross sectional area. While this construction provides a particularly desirable embodiment, the regenerator construction should not be limited, since it is obvious that the downpipe 5 may be placed other than centrally within lower section 1, or that a plurality of smaller downpipes could be used to transfer the catalyst downwardly to the lower zone of the series. The regenerator described, also has an enlarged upper portion to facilitate catalyst settling, however, it should be understood that the present invention is not limited to that particular construction feature, for the improved operation may well be carried out in a chamber of uniform cross-sectional area or diameter.

Although not illustrated, a somewhat more simplified embodiment of the regenerator construction may be made by omitting the distillation zone 4', in which case the recycle flow path will be through each of the series of reactivation contact zones 4, with the downpipe 5 extending from the top zone to the bottom zone of the series. Also, the locations of the spent catalyst inlet 6 and the withdrawal line 7 need not be limited to the positioning shown in the drawing, since under the recirculation method of this invention, the movement of particles is relatively fast and the carbon deposit on the catalyst is substantially equalized in all of the zones.

I claim as my invention:

1. In the regeneration of finely divided catalyst particles which have been contaminated with a carbonaceous deposit, the improved method of regeneration which comprises charging contaminated catalyst to a regenerating zone and maintaining fluidized beds of said catalyst in a series of connecting and superimposed contacting zones, passing a regenerating gas stream to the lowermost of said zones, transferring catalyst in a fluidized condition successively upwardly through each of said contacting zones in a manner precluding any downward movement of catalyst particles from one contacting zone to another and at a relatively high rate such as to maintain a substantially uniform temperature throughout the regenerating zone, accumulating catalyst particles in an upper zone of said series and recycling them in a relatively compact descending column to the lowermost zone in a confined path extending through the intermediate zones of said series to maintain a continuous cyclic flow of the catalyst upwardly through said series of contact zones, withdrawing regenerated catalyst particles substantially free of said carbonaceous deposit from said regenerating zone, and discharging resulting flue gases from the upper portion thereof.

2. In the regeneration of finely divided catalyst particles which have been contaminated with a carbonaceous deposit, the improved method of regeneration which comprises charging contaminated catalyst to a regenerating zone and therein maintaining fluidized beds of said catalyst in a series of connecting and superimposed contacting zones, passing a regenerating gas stream to the lowermost of said zones, restricting the flow between the series of zones and maintaining successively lower pressures from lowermost to uppermost of said zones, transferring catalyst in a fluidized condition successively upward through each of said connecting zones at a controlled velocity precluding any downward movement of catalyst particles from one contacting zone to another and at a relatively high rate such as to maintain a substantially uniform temperature throughout the regenerating zone, accumulating catalyst particles in an upper zone of said series and recycling them in a relatively compact descending column of particles to the lowermost zone in a confined path extending through the intermediate zones of said series and thereby maintaining a continuous cyclic flow of the catalyst upward through said series of contact zones, withdrawing regenerated catalyst from said regenerating zone, and discharging resulting combustion gases from the upper portion thereof.

3. An improved method of stripping and regenerating catalyst contaminated with a carbonaceous deposit which comprises maintaining a regeneration zone having an upper settling zone, an intermediate stripping zone and a lower burning zone, maintaining a dense fluidized catalyst and gas phase in said stripping and burning zones and a dilute catalyst and gas phase in said settling zone, maintaining within said burning zone a series of connecting and superimposed smaller burning zones, passing an oxygen-containing regeneration gas stream to the lowermost of said smaller burning zones and fluidizing the catalyst in each of said smaller burning zones and in said stripping zone with said regeneration gas stream, discharging used regeneration gas from the upper portion of said settling zone, passing said contaminated catalyst to said stripping zone and therein stripping volatilizable contaminants, withdrawing catalyst from said stripping zone and passing it to the uppermost of said smaller burning zones while permitting regeneration gas to carry a lesser quantity of catalyst from said smaller burning zone to said stripping zone, withdrawing catalyst in a compact descending column from the uppermost of said smaller burning zones and passing it to the lowermost of said smaller burning zones, transporting catalyst by means of the regeneration gases upwardly from each of said smaller burning zones to the next upper zone while maintaining successively lower pressures from lowermost to uppermost of said smaller burning zones in a manner precluding downward movement of catalyst from any of said burning zones to the zone next lower, burning carbonaceous contaminant from said catalyst in at least some of said smaller burning zones, and withdrawing regenerated catalyst from said burning zone.

4. An improved method of stripping and regenerating catalyst contaminated with a carbonaceous deposit which comprises maintaining a regeneration zone having an upper settling zone and a lower burning zone, maintaining a dense fluidized catalyst and gas phase in said burning zone and a dilute catalyst and gas phase in said settling zone, maintaining within said burning zone a series of connecting and superimposed smaller burning zones, passing an oxygen-containing regeneration gas stream to the lowermost of said smaller burning zones and fluidizing the catalyst in each with said regeneration gas, discharging used regeneration gas from the upper portion of said settling zone, passing said contaminated catalyst to the uppermost of said smaller burning zones, withdrawing catalyst in a compact descending column from the uppermost of said smaller burning zone and passing it to the lowermost of said smaller burning zones in a confined path extending through the intermediate zones of said series, transporting catalyst by means of the regeneration gases upwardly from each of said smaller burning zones to the next upper zone at a relatively high rate such as to maintain a substantially uniform temperature throughout said smaller burning zones, maintaining successively lower pressures from the lowermost to uppermost of said smaller burning zones whereby downward movement of catalyst from any one of the burning zones to the next lower zone is precluded, burning carbonaceous contaminant from said catalyst in at least some of said smaller burning zones, and withdrawing regenerated catalyst from said burning zone.

5. An improved method of regenerating catalyst contaminated with carbonaceous matter which comprises maintaining within a regenerating zone an upper settling zone, a stripping zone and a series of fluidized catalyst beds within connecting and superimposed smaller contacting and burning zones, passing said contaminated catalyst into said stripping zone at a point having combustion gases of low oxygen concentration and therein stripping said catalyst of volatilizable hydrocarbonaceous matter, passing an oxygen-containing regenerating gas stream to the lower of said series of contacting zones, fluidizing the catalyst particles therein with said regenerating gas stream and burning said contaminating deposit from said catalyst particles while transferring them upwardly through the successive superimposed contacting zones, controlling the pressure drop between zones and the velocity of the gas stream and upward flow of hot catalyst particles therein to preclude any downward flow of particles between adjacent zones, separating the upwardly transported catalyst from the resulting combustion gases in the upper portion of said regenerating zone and returning the separated catalyst particles together with said contaminated catalyst passed to the upper stripping zone in a compact descending column therefrom to the lowermost contacting zone, recycling the catalyst upwardly through said superimposed series of fluidized contact beds, discharging flue gases from said upper settling zone of said regenerating zone, and withdrawing a stream of regenerated catalyst particles from the lower portion of the regenerating zone.

6. An improved method of regenerating catalyst contaminated with carbonaceous matter which comprises maintaining within a regenerating zone a series of relatively dense beds of fluidized catalyst within connecting and superimposed smaller contacting zones, passing said contaminated catalyst into the uppermost of said contacting zones, permitting gravity flow therethrough and stripping said particles with combustion gases provided in a manner to be hereinafter stated, passing an oxygen containing regenerating gas stream to the lower of said smaller zones and thereby fluidizing the catalyst particles in each of said series of zones while burning said contaminating deposit from said catalyst particles and transferring them successively upward through the series of superimposed contacting zones, restricting the flow area between said zones and maintaining thereby successively lower pressures from the lower to the upper of said series of zones, controlling the velocity of the gas stream to provide an upward flow of the hot catalyst particles through said series of zones and such that there is no downward flow of particles between adjacent zones, separating the upwardly transported catalyst particles from the resulting combustion gases in the upper portion of said regenerating zone and returning them with said charged and stripped contaminated catalyst in a straight line unaerated and descending flow stream therefrom to the lowermost contacting zone of said series, recycling the catalyst upwardly through said series of zones and contacting beds, discharging flue gases from the upper end of said regenerating zone, and withdrawing a stream of regenerated catalyst particles from the lower portion of the regenerating zone.

LOUIS S. KASSEL.

REFERENCES CITED

The following references are of record in the file of this patent:

UNITED STATES PATENTS

| Number | Name | Date |
| --- | --- | --- |
| 2,367,281 | Johnson | Jan. 16, 1945 |
| 2,367,351 | Hemminger | Jan. 16, 1945 |
| 2,378,342 | Voorhees et al. | June 12, 1945 |
| 2,383,636 | Wurth | Aug. 28, 1945 |
| 2,409,780 | Mekler | Oct. 22, 1946 |
| 2,418,003 | Angell | Mar. 25, 1947 |
| 2,419,098 | Stratford et al. | Apr. 15, 1947 |
| 2,446,678 | Voorhees | Aug. 10, 1948 |
| 2,447,116 | Collins | Aug. 17, 1948 |
| 2,488,031 | Gunness | Nov. 15, 1949 |
| 2,514,288 | Nicholson | July 4, 1950 |

FOREIGN PATENTS

| Number | Country | Date |
| --- | --- | --- |
| 574,892 | Great Britain | Jan. 24, 1946 |